(12) United States Patent
Sreedharan Nair et al.

(10) Patent No.: US 9,720,489 B2
(45) Date of Patent: Aug. 1, 2017

(54) SYSTEM COMPRISING A MAIN ELECTRICAL UNIT AND A PERIPHERAL ELECTRICAL UNIT

(75) Inventors: Biju Kumar Sreedharan Nair, Veldhoven (NL); Willem Franke Pasveer, Dordrecht (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 162 days.

(21) Appl. No.: 14/239,162

(22) PCT Filed: Aug. 17, 2012

(86) PCT No.: PCT/IB2012/054193
§ 371 (c)(1),
(2), (4) Date: Feb. 17, 2014

(87) PCT Pub. No.: WO2013/027163
PCT Pub. Date: Feb. 28, 2013

(65) Prior Publication Data
US 2014/0195842 A1    Jul. 10, 2014

Related U.S. Application Data

(60) Provisional application No. 61/526,396, filed on Aug. 23, 2011.

(51) Int. Cl.
G06F 1/32         (2006.01)
H05B 37/02     (2006.01)

(52) U.S. Cl.
CPC ....... *G06F 1/3293* (2013.01); *H05B 37/0227* (2013.01); *H05B 37/0245* (2013.01); *H05B 37/0254* (2013.01)

(58) Field of Classification Search
CPC .. G06F 1/3293; G06F 13/4291; G06F 13/385; G06F 1/32; G06F 1/3203;
(Continued)

(56) References Cited

U.S. PATENT DOCUMENTS 5,692,197 A    11/1997    Narad et al.
5,784,581 A    7/1998    Hannah
(Continued)

FOREIGN PATENT DOCUMENTS

JP    H10125475 A    5/1998
JP    2009525565 A    7/2009
(Continued)

OTHER PUBLICATIONS

Microsoft. "Configuring Windows XP IEEE 802.11 Wireless Networks for the Home and Small Business." Configuring Windows XP IEEE 802.11 Wireless Networks for the Home and Small Business. Microsoft, Mar. 9, 2006. Web. Sep. 12, 2016. <https://technet.microsoft.com/en-us/library/bb457016(d=printer).aspx>.*

*Primary Examiner* — Jaweed A Abbaszadeh
*Assistant Examiner* — Brian J Corcoran
(74) *Attorney, Agent, or Firm* — Meenakshy Chakravorty

(57) ABSTRACT

The invention relates to a system comprising a main electrical unit (2) and a peripheral electrical unit (3, 4,5), wherein the main electrical unit and the peripheral electrical unit are switchable between a low-power mode and a high-power mode. The main electrical unit is adapted to hand over a control of the system to the peripheral electrical unit, if the peripheral electrical unit is in the high-power mode, and to switch from the high-power mode to the low-power mode, after the control has been handed over. The peripheral electrical unit is adapted to receive the control from the main electrical unit and to control the system, if the peripheral electrical unit is in the high-power mode. This allows the system to be still in operation mode, although the main electrical unit has been switched to the low-power mode, thereby reducing the power consumption of the system.

13 Claims, 3 Drawing Sheets

(58) Field of Classification Search
CPC .... G06F 1/3206; G06F 1/3253; G06F 1/3243; H05B 37/0227; H05B 37/0254; H05B 37/0245; G05B 37/0245
See application file for complete search history.

(56) References Cited

U.S. PATENT DOCUMENTS

| | | | | |
|---|---|---|---|---|
| 6,484,082 | B1* | 11/2002 | Millsap | H04L 12/4035 701/32.7 |
| 6,704,584 | B2* | 3/2004 | Litwin | H04M 1/72505 320/108 |
| 6,735,448 | B1* | 5/2004 | Krishnamurthy | H04W 52/343 370/318 |
| 6,748,548 | B2 | 6/2004 | Bormann et al. | |
| 6,802,018 | B2 | 10/2004 | Bormann et al. | |
| 7,369,060 | B2* | 5/2008 | Veskovic | H05B 37/0254 340/12.52 |
| 8,214,061 | B2* | 7/2012 | Westrick, Jr. | H05B 37/0218 315/312 |
| 8,218,519 | B1* | 7/2012 | Chamberlain | H04W 74/0841 370/343 |
| 8,476,565 | B2* | 7/2013 | Verfuerth | H05B 37/0272 250/205 |
| 2002/0124125 | A1 | 9/2002 | Bormann et al. | |
| 2004/0174909 | A1* | 9/2004 | Marais | H04L 12/12 370/524 |
| 2006/0044152 | A1* | 3/2006 | Wang | H04L 12/2803 340/2.24 |
| 2006/0125426 | A1 | 6/2006 | Veskovic et al. | |
| 2006/0143348 | A1* | 6/2006 | Wilson | G06F 13/4291 710/110 |
| 2006/0215576 | A1* | 9/2006 | Yu | H04W 48/18 370/252 |
| 2006/0218419 | A1* | 9/2006 | Iwamura | G06F 1/3209 713/300 |
| 2006/0244624 | A1* | 11/2006 | Wang | H05B 37/0272 340/815.67 |
| 2006/0271797 | A1* | 11/2006 | Ginggen | G06F 1/3203 713/300 |
| 2008/0143477 | A1* | 6/2008 | Eichin | B60R 25/246 340/5.61 |
| 2009/0001892 | A1* | 1/2009 | Van Boekhout | H05B 37/0254 315/149 |
| 2009/0085631 | A1* | 4/2009 | Lambrecht | G06F 13/4291 327/299 |
| 2011/0118890 | A1 | 5/2011 | Parsons | |

FOREIGN PATENT DOCUMENTS

| | | |
|---|---|---|
| WO | 2004023849 A1 | 3/2004 |
| WO | 2009102192 A1 | 8/2009 |
| WO | 2011094837 A1 | 8/2011 |

* cited by examiner

SYSTEM COMPRISING A MAIN ELECTRICAL UNIT AND A PERIPHERAL ELECTRICAL UNIT

FIELD OF THE INVENTION

The invention relates to a system comprising a main electrical unit and a peripheral electrical unit. The invention relates further to a method and a computer program for controlling the system.

BACKGROUND OF THE INVENTION

A system comprising a main electrical unit and a peripheral electrical unit is, for example, a master/slave system comprising a master device like a microcontroller unit and one or several slave devices being, for example, transceivers for communication, sensors, et cetera. Since the master and slave devices all consume power, the overall power consumption of the master/slave system is relatively high.

SUMMARY OF THE INVENTION

It is regarded as being an object of the invention to provide a system comprising a main electrical unit and a peripheral electrical unit, which comprises lower power consumption. It is a further object of the present invention to provide a method and a computer program for controlling the system, which allow the system to be operated with lower power consumption.

In a first aspect of the present invention a system comprising a main electrical unit and a peripheral electrical unit is presented, wherein the main electrical unit and the peripheral electrical unit are switchable between a low-power mode and a high-power mode, wherein the main electrical unit is adapted to hand over a control of the system to the peripheral electrical unit, if the peripheral electrical unit is in the high-power mode, and to switch from the high-power mode to the low-power mode, after the control has been handed over, and wherein the peripheral electrical unit is adapted to receive the control from the main electrical unit and to control the system, if the peripheral electrical unit is in the high-power mode.

Since the main electrical unit is adapted to hand over the control of the system to the peripheral electrical unit and to switch from the high-power mode to the low-power mode, after the control has been handed over, and since the peripheral electrical unit is adapted to receive the control from the main electrical unit and to control the system, after the control has been received, the system can still be operated, although the main electrical unit has been switched to the low-power mode. This allows reducing the power consumption of the system.

If an electrical unit, i.e. the main electrical unit or the peripheral electrical unit, has the control of the system, which can also be regarded as being the master right, the electrical unit defines preferentially the actions of the system, in particular, of the electrical unit having the control and of the other electrical units. For example, if the main electrical unit has the master right, only those peripheral electrical units can be active that are necessary to perform certain tasks as defined by the main electrical unit.

Preferentially, the high-power mode is an active mode and the low-power mode is a sleep mode, in particular, a deep sleep mode. The main electrical unit and the peripheral electrical unit can have only two power modes, in particular, only a high-power mode and a low-power mode, for example, only an active mode and a sleep mode, or the main electrical unit and the peripheral electrical unit can have more than two power modes, for example, an active mode having the largest power consumption, a sleep mode having less power consumption and a deep sleep mode having the lowest power consumption. In the different power modes different functionalities of the respective electrical unit are enabled, leading to the different power consumptions. For instance, if the main electrical unit is a microcontroller, in the active mode all functions of the microcontroller can be enabled, in the sleep mode IO trigger, RAM function, et cetera can be enabled, and in the deep-sleep mode only certain functions like a real time clock (RTC), watchdog timer, et cetera can be enabled.

It is preferred that the main electrical unit comprises forward handover rules defining under which conditions the control is to be handed over to the peripheral electrical unit, wherein the main electrical unit is adapted to hand over the control to the peripheral electrical unit, if the conditions defined by the forward handover rules are fulfilled. For example, the system can comprise several peripheral electrical units and the forward handover rules can define to which peripheral electrical unit, which is in the high-power mode, the control is to be handed over.

In an embodiment, the system comprises a plurality of peripheral electrical units, wherein the main electrical unit is adapted to hand over the control to one or several peripheral electrical units, which are in the high-power mode, if the number of peripheral electrical units, which are in the high-power mode, is smaller than or equal to a predefined number, wherein the predefined number is preferentially one. These rules can ensure that the control is handed over from the main electrical unit to a peripheral electrical unit only if the handover will lead to a substantial reduction in power consumption. For example, the handover rules can define that the control is handed over to a peripheral electrical unit, if the peripheral electrical unit is the only peripheral electrical unit being in the high-power mode.

It is further preferred that the peripheral electrical unit is adapted to send an acknowledgement to the main electrical unit, if the peripheral electrical unit has received the control, wherein the main electrical unit is adapted to switch from the high-power mode to the low-power mode, after the main electrical unit has received the acknowledgement. This ensures that the control, which may be regarded as being a master right, is always assigned to at least one of a) the main electrical unit and b) the one or several peripheral electrical units.

It is also preferred that the peripheral electrical unit comprises back handover rules defining under which conditions the control is to be handed over back to the main electrical unit, wherein the peripheral electrical unit is adapted to hand over the control back to the main electrical unit, if the conditions defined by the back handover rules are fulfilled. For instance, if the peripheral electrical unit is a movement sensor, the back handover rules can define that the control is to be handed over back to the main electrical unit, if the movement sensor detects a movement. Or, if the peripheral electrical unit is a transceiver, the back handover rules can define that the control is to be handed over back to the main electrical unit, if the transceiver receives any data, or only if the transceiver receives a certain predefined kind of data.

In an embodiment, if the control is to be handed over back to the main electrical unit, the peripheral electrical unit can send an interrupt to the main electrical unit to wake up the main electrical unit, i.e. to switch the main electrical unit from the low-power mode to a high-power mode, and handshake with the main electrical unit. This waking up procedure can be performed, for example, through a data bus interface or via a separate interrupt line.

Preferentially, the main electrical unit is adapted to send an acknowledgement to the peripheral electrical unit, if the main electrical unit has received the control, wherein the peripheral electrical unit is adapted to continue controlling the system, until the peripheral electrical unit has received the acknowledgement. This ensures that the control, which may also be regarded as being a master right, is always assigned to at least one of the main electrical unit and the one or several peripheral electrical units.

It is further preferred that the main electrical unit is a microcontroller unit and the system comprises one or several peripheral electrical units being at least one of a sensor, a transceiver, an interface, and a light source. The sensor is, for example, a light sensor, a temperature sensor or a movement sensor. The interface is, for example, a bus, a storage device, an I/O device, et cetera. The transceiver is, for instance, a radio frequency transceiver, an Ethernet transceiver, et cetera. The peripheral electrical units are configured to communicate with the main electrical unit and optionally to each other. They comprise preferentially interface controllers for allowing the peripheral electrical units to act and communicate with the main electrical unit and optionally to each other. In particular, the interface controllers are adapted to act in accordance with the respective defined rules. For example, the light source can comprise a lighting interface controller controlling a) the light emission of the light source and b) the communication with the main electrical unit and optionally the other peripheral electrical units, in particular, the reception and the sending of requests and acknowledgements. In an embodiment, the system is a lighting system comprising a light source and a sensor like a movement sensor, a light sensor, a temperature sensor, et cetera as peripheral electrical units, and a main controller like a microcontroller as the main electrical unit. Thus, a lighting system can be provided, which can react to external influences like detected movements and/or ambient light, wherein the power consumption of the lighting system can be reduced.

It is also preferred that the main electrical unit is adapted to hand over control rules with handing over the control to the peripheral electrical unit, wherein the control rules define the control performed by the peripheral electrical unit. In particular, the control rules define, which actions are allowed to be performed by the peripheral electrical unit, without requiring the main electrical unit to switch in the high-power mode. For example, if the peripheral electrical unit is a transducer and the main electrical unit is a microcontroller, the control rules can define that the transceiver can send and/or receive heartbeat messages, and send acknowledgments after having received a heartbeat message, while the main electrical unit can remain in the low-power mode.

In an embodiment, the system comprises several peripheral electrical units, wherein the control rules define which requests can be sent to which peripheral electrical unit by the peripheral electrical unit having the control. The peripheral electrical unit, which has received the control, can therefore control the other peripheral electrical units, without requiring switching the main electrical unit from the low-power mode to the high-power mode. In an embodiment, one of the peripheral electrical units is a movement sensor, which has the control and can send a request to another peripheral electrical unit to perform a desired action, if the movement sensor has detected a movement. The other peripheral electrical unit is, for example, a light source, wherein the movement sensor can send a request to the light source to switch on the light, if the movement sensor has detected a movement, without requiring switching the main electrical unit to the high-power mode. This can further reduce the power consumption of the system.

In an embodiment, the system comprises several peripheral electrical units, wherein the peripheral electrical units are switchable between a low-power mode and a high-power mode, wherein the main electrical unit is adapted to hand over a control of the system from the one or several of the peripheral electrical units, if the respective one or several peripheral electrical units are in the high-power mode, and to switch the main electrical unit from the high-power mode to the low-power mode, after the control has been handed over, wherein the peripheral electrical units are adapted to receive the control from the respective main electrical unit and to control the system, if the respective peripheral electrical unit is in the high-power mode.

In a further aspect of the present invention a method for controlling a system comprising a main electrical unit and a peripheral electrical unit is presented, wherein the main electrical unit and the peripheral electrical unit are switchable between a low-power mode and a high-power mode, the method comprising:

handing over a control of the system from the main electrical unit to the peripheral electrical unit, if the peripheral electrical unit is in the high-power mode, controlling the system by the peripheral electrical unit, if the peripheral electrical unit is in the high-power mode and has received the control from the main electrical unit, and switching the main electrical unit from the high-power mode to the low-power mode, after the control has been handed over.

In a further aspect of the present invention a computer program for controlling a system comprising a main electrical unit and a peripheral electrical unit is presented, wherein the main electrical unit and the peripheral electrical unit are switchable between a low-power mode and a high-power mode, the computer program comprising program code means for causing the system to carry out the steps of the method as defined in claim 12, when the computer program is run on a computer controlling the system.

It shall be understood that the system of claim 1, the method of claim 12 and the computer program of claim 13 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF THE EMBODIMENTS

Figure 1:
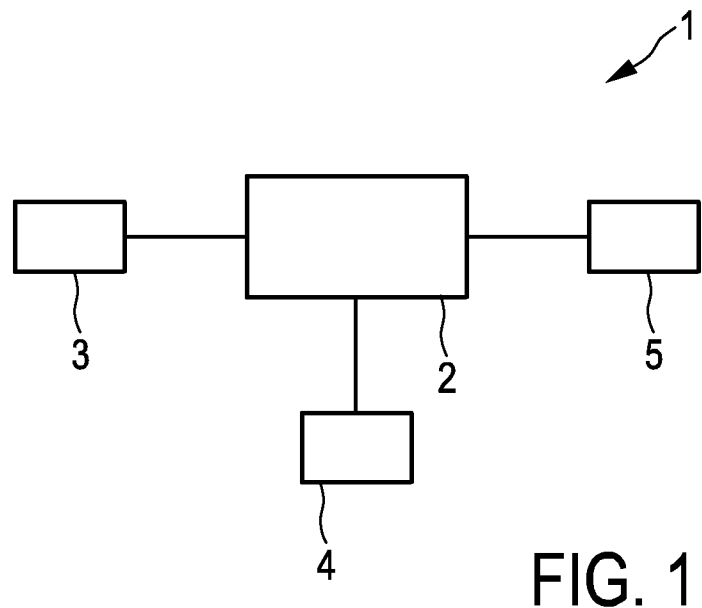
FIG. 1 shows schematically and exemplarily an embodiment of a system comprising a main electrical unit and peripheral electrical units.

FIG. 1 shows schematically and exemplarily an embodiment of a system 1 comprising a main electrical unit 2 and several peripheral electrical units 3, 4, 5. In this embodiment, the main electrical unit 2 is a microcontroller unit being switchable between a low-power mode and a high-power mode. The low-power mode is a sleep mode of the microcontroller unit and the high-power mode is an active mode of the microcontroller unit. The several peripheral electrical units 3, 4, 5 can include, for example, a sensor, a transceiver, an interface, a light source, et cetera. For example, the peripheral electrical unit 3 can be a light sensor, the peripheral electrical unit 4 can be a movement sensor and the peripheral electrical unit 5 can be a light source. Thus, the system 1 can be a lighting system for providing light of the light source 5 depending on ambient light detected by the light sensor 3 and depending on a movement detection signal generated by the movement sensor 4.

The main electrical unit 2 is adapted to hand over a control of the system to one or several of the peripheral electrical units 3, 4, 5, if the respective peripheral electrical unit 3, 4, 5 is in the high-power mode, and to switch from the high-power mode to the low-power mode, after the control has been handed over. Correspondingly, the peripheral electrical units 3, 4, 5 are adapted to receive the control from the main electrical unit 2 and to control the system, if the respective peripheral electrical unit 3, 4, 5 is in the high-power mode.

The main electrical unit can be regarded as being an initial master unit and the peripheral electrical unit 3, 4, 5 can be regarded as being initial slave units. Correspondingly, the handing over of the control of the system can be regarded as handing over the master right of the system. After the master right has been handed over to an initial slave unit, the respective initial slave unit becomes a master unit.

The electrical unit, i.e. the main electrical unit 2 or one or several of the peripheral electrical units 3, 4, 5, which has the master right, i.e. which has the control of the system, controls the other electrical units, in particular, the other peripheral electrical units. For example, the peripheral electrical unit having the control can send requests to and receive data from the other peripheral electrical units.

The main electrical unit 2 comprises forward handover rules defining under which conditions the control is to be handed over to the respective peripheral electrical unit 3, 4, 5, wherein the main electrical unit 2 is adapted to hand over the control to the respective peripheral electrical unit 3, 4, 5, if the conditions defined by the forward handover rules are fulfilled. The forward handover rules can define, for example, to which of the peripheral electrical units 3, 4, 5 the control is to be handed over. Moreover, the forward handover rules can define that the control is handed over to one or several of the peripheral electrical units 3, 4, 5 which are in the high-power mode, if the number of peripheral electrical units, which are in the high-power mode, is smaller than or equal to a predefined number, in particular, if only one peripheral electrical unit is in the high-power mode. In an embodiment, the forward handover rules define one or several peripheral electrical units, to which the control can be handed over, wherein, if one of these peripheral electrical units is in the high-power mode, the control is handed over to this peripheral electrical unit. The forward handover rules can also define a priority list of peripheral electrical units, wherein, if several peripheral electrical units are in the high-power mode and if the number of these peripheral electrical units in the high-power mode is smaller than or equal to the predefined number, the control is handed over to the peripheral electrical unit, which is in the high-power mode and has the highest priority in the priority list.

The peripheral electrical units 3, 4, 5 are adapted to send an acknowledgement to the main electrical unit 2, if the respective peripheral electrical unit 3, 4, 5 has received the control, wherein the main electrical unit 2 is adapted to switch from the high-power mode to the low-power mode, after the main electrical unit 2 has received the acknowledgement.

The peripheral electrical units 3, 4, 5 are further adapted to hand over the control back to the main electrical unit 2 in accordance with provided back handover rules. For example, if the control has been handed over to the movement sensor 4, the back handover rules can define that the control is to be handed over back to the main electrical unit 2, if the movement sensor 4 detects a movement. Or, for example, if in another embodiment a peripheral electrical unit is the transceiver to which the control has been handed over and which is in the high-power mode for listening for incoming data, the back handover rules can define that the control as to be handed over back to the main electrical unit, if the transceiver receives any data, or if the transceiver receives a certain predefined kind of data.

If the control, i.e. the master right, is to be handed over back to the main electrical unit 2, the respective peripheral electrical units 3, 4, 5 can send an interrupt to the main electrical unit 2 to wake up the main electrical unit 2, i.e. to switch the main electrical unit 2 from the low-power mode to the high-power mode, and handshake with the main electrical unit 2. This waking up procedure can be performed, for example, through a data bus interface or via a separate interrupt line.

Not only the respective peripheral electrical units 3, 4, 5, but also the main electrical unit 2 is preferentially adapted to send an acknowledgement. In particular, the main electrical unit 2 can be adapted to send an acknowledgement to the respective peripheral electrical unit 3, 4, 5, if the main electrical unit 2 has received the control, wherein the peripheral electrical unit 3, 4, 5 is adapted to continue controlling the system, until the respective peripheral electrical unit 3, 4, 5 has received the acknowledgement.

The main control unit 2 is adapted to hand over control rules with handing over the control to the respective peripheral electrical unit 3, 4, 5, wherein the control rules define the control performed by the respective peripheral electrical unit 3, 4, 5. The control rules define, which actions are allowed to be performed by the respective peripheral electrical unit 3, 4, 5, without requiring the main electrical unit 2 to switch in the high-power mode. For example, if in an embodiment a peripheral electrical unit is a transducer and the main electrical unit is a microcontroller, the control rules can define that the transceiver is allowed to send and/or receive heartbeat messages and send acknowledgements after having received a heartbeat message, while the main electrical unit can remain in the low-power mode.

The control rules can be adapted to define which requests can be sent to which peripheral electrical unit by the respective peripheral electrical unit having the control, i.e.

having the master right. The respective peripheral electrical unit, which has received the control, can therefore control the other peripheral electrical units, without requiring switching the main electrical unit from the low-power mode to the high-power mode. For example, if one of the peripheral electrical units is a movement sensor, which has the control, the movement sensor can send a request to another peripheral electrical unit to perform a desired action, if the movement sensor has detected a movement. The other peripheral electrical unit is, for example, a light source, wherein the movement sensor can send a request to the light source to switch on the light, if the movement sensor has detected a movement, without requiring switching the main electrical unit to the high-power mode. For allowing the respective peripheral electrical unit to directly send a request to another peripheral electrical unit, without requiring the main electrical unit to be switched to the high-power mode, the main electrical unit and the peripheral electrical units can be connected as schematically and exemplarily shown in FIG. 2.

The peripheral electrical units are configured to communicate with the main electrical unit and to each other. They comprise preferentially interface controllers for allowing the peripheral electrical units to act and communicate with the main electrical unit and optionally to each other. In particular, the interface controllers are adapted to act in accordance with the respective defined rules. For example, the light source can comprise a lighting interface controller controlling a) the light emission of the light source and b) the communication with the main electrical unit and the other peripheral electrical units, in particular, the reception and the sending of requests and acknowledgements.

Figure 2:
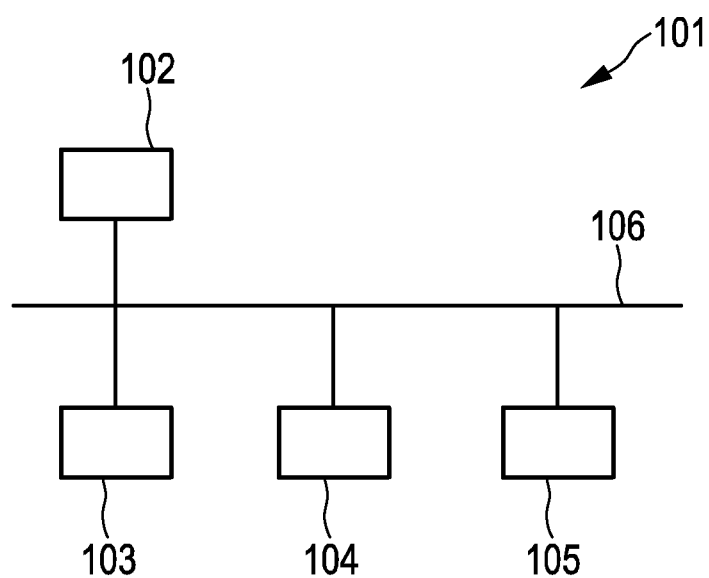
FIG. 2 shows schematically and exemplarily a further embodiment of the system comprising a main electrical unit and peripheral electrical units.

In FIG. 2, a main electrical unit being a microcontroller unit 102 is connected to a data bus 106. Moreover, also peripheral electrical units 103, 104, 105, which are, in this embodiment, a light sensor, a movement sensor, and a light source, respectively, are connected to the data bus 106. If the main electrical unit 102 has the control, i.e. has the master right, it can send requests to the peripheral electrical units 103, 104, 105 and receive data from these peripheral electrical units via the data bus 106. Moreover, after the control has been handed over from the main electrical unit 102 to a peripheral electrical unit 103, 104, 105, the respective peripheral electrical unit, which has received the control, can send requests to and receive data from the other peripheral electrical units via the data bus 106.

The main electrical unit can be adapted to receive an external signal for disabling or enabling the function of handing over the control from the main electrical unit to one or more several peripheral electrical units. For example, the main electrical unit can be connected with a building management network for receiving a corresponding signal, wherein, for example, a user can send a corresponding signal to the main electrical unit or, if the main electrical unit is in a sleep mode, to a peripheral electrical unit which can wake up the main electrical unit. In an embodiment, the external signal can be sent to the main electrical unit through wired or wireless communication means, in particular, via a peripheral electrical device which may wake the main electrical unit up, if the main electrical unit is in a sleep mode. If the main electrical unit had handed over the control to a peripheral electrical unit, after having woken up, the control can be handed over back to the main electrical unit and the function of forwarding the control from the main electrical unit to a peripheral electrical unit can be disabled. If, in another situation, the main electrical unit still has the control, the function of forwarding the control to a peripheral electrical unit depending on forward handover rules can be disabled, if a corresponding external signal is received by the main electrical unit. This function of forward handing over can be disabled, for example, in order to perform a peak shaving or in case of emergency. For instance, the function of forward handing over can be disabled, in order to allow the main electrical unit to convey a corresponding message directly to a light source for reducing the power consumption. In case of emergency like a fire or a theft, the main electrical unit can communicate to the light source to switch to a high power mode for providing an emergency lighting. The function of forward handing over can remain disabled, until a corresponding enabling signal has been received by the main electrical unit.

Figure 3:
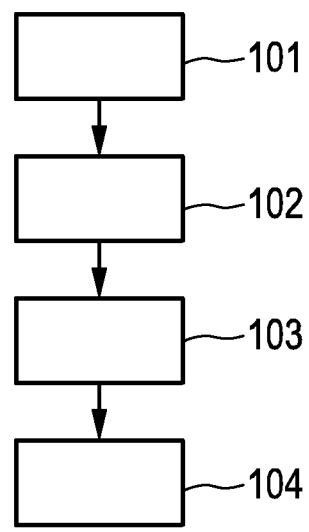
FIG. 3 shows a flowchart exemplarily illustrating an embodiment of a method for controlling the system comprising a main electrical unit and peripheral electrical units.

In the following an embodiment of a method for controlling a system comprising a main electrical unit and a peripheral electrical unit, wherein the main electrical unit and the peripheral electrical unit are switchable between a low-power mode and a high-power mode, will exemplarily be described with reference to a flowchart shown in FIG. 3.

In step 101, in an initial situation the main electrical unit has the control over the system, i.e. has the master right, and controls the peripheral electrical units, for instance, sends requests to the peripheral electrical units and receives data from the peripheral electrical units. The main electrical unit is, for example, a microcontroller unit and the peripheral electrical units are, for example, a movement sensor, a light sensor, and a light source. Thus, the system can be a lighting system.

In step 102, the control of the system is handed over from the main electrical unit to a peripheral electrical unit being in the high-power mode. For example, if the light source is in a low-power mode and the movement sensor and the light sensor are in the high-power mode for being active for sensing light and movements, it may not be necessary that the microcontroller unit remains in the high-power mode. In this situation, the main electrical unit can handover the control, i.e. the master right, to the movement sensor and/or the light sensor. Under which conditions the main electrical unit is allowed to hand over the control, i.e. the master right, to which peripheral electrical units in the high-power mode can be defined by forward handover rules. Moreover, with handing over the control to a peripheral electrical unit preferentially also control rules are handed over to the respective peripheral electrical unit, wherein the control rules define which actions the respective peripheral electrical unit is allowed to perform.

After the control has been handed over to the respective peripheral electrical unit, in step 103, the system is controlled by the peripheral electrical unit.

In step 104, the main electrical unit is switched from the high-power mode to the low-power mode. In particular, the microcontroller unit is switched from an active mode into a sleep mode, while the system is controlled by the respective peripheral electrical unit having received the master right.

The above described system can be regarded as an intelligent system that manages master/slave rights and by that a swapping of low-power states and high-power states, in particular, of active states and sleep states, between the peripheral electrical units to achieve low-power consumption and reduced stand-by power. In particular, an event-trigger from one of the peripheral electrical units, for instance, from a movement sensor, can wake up sleeping peripheral electrical units such that the woken up peripheral electrical units can perform a desired action.

Generally, a system can comprise a master device, i.e. a main electrical unit like a microcontroller unit, and many peripheral devices, i.e. many peripheral electrical devices like a transceiver for communication, sensors, et cetera, which are configured as slaves. In prior art systems, mostly the master device has to be in an active mode, even if there is only one peripheral device active. Such known systems include, for example, outdoor lighting controller systems with wireless communication capability. In these systems the master device is active, as long as, for example, a transceiver unit being a slave device is active, even if the transceiver unit is only active for listening for signals like radio frequency signals. This imitation, i.e. the requirement that the master device has to be active all the time, is generally prescribed by the used interface protocol between the master device, i.e. the microcontroller unit, and the transceiver unit, i.e. the slave device, thereby forcing the system to have a high power consumption even in the listening mode, which may also be regarded as being a stand-by mode. Interface protocols such as the Serial Peripheral Interface (SPI) do not allow the master device to sleep and the slave device to be active. In contrast, the system described above with reference to FIGS. 1 and 2 can be more power efficient, because the power hungry main electrical unit, i.e. the initial master device, can have a handshake with a peripheral electrical unit, i.e. with a peripheral device, to hand over the master right, wherein, after the master right has been handed over, the main electrical unit can enter into, for example, a sleep mode or a deep sleep mode. In the case of an event, the system may require multiple peripheral devices and/or the master device for full operation. In that situation, the peripheral device having the master right can return the right to the main electrical unit, for instance, the microcontroller unit, so that the system will be fully functional again. This way, the power consumption can be reduced to a large extent. For instance, if only one peripheral device is active, a microcontroller unit being the main electrical unit can hand over the master right to the active peripheral device and then the microcontroller unit can go into the sleep mode, thereby reducing the power consumption of the system.

The system described above with reference to FIGS. 1 and 2 is a low-power system, which is realized by reducing the overhead energy expenditure from an active main electrical unit, when one or more peripheral electrical units work in a stand-alone fashion. The system can be a multi-master/multi-slave system having an extremely low stand-by power. While handing over the master right, a microcontroller unit can define priorities, i.e. control rules, for the new master device to perform actions. For some actions, the new master device, i.e. the peripheral electrical unit, to which the master right has been transferred, doesn't need to wake up the main electrical unit, instead it can take action itself.

The main electrical unit can be a microcontroller unit like the microcontroller unit named LPC2144 from the company NXP having a predefined power consumption of, for example, about 200 mW in the active mode, i.e. in the high-power mode. At least some of the peripheral electrical units may consume less power. For instance, a transceiver unit like the transceiver unit named AT86RF212 from the company Atmel may consume a predefined power of about 60 mW and a passive infrared movement sensor may consume about 1 mW. Even if the transceiver unit is in a listening mode for listening for data, both, the transceiver unit and the microcontroller unit, will in known systems be in the active mode, which leads to an overall power consumption of the system of about 260 mW. With respect to power consumption such a known system is therefore very inefficient. However, if the master right can be handed over from the microcontroller unit to the transceiver unit as described above with reference to FIGS. 1 to 3, the microcontroller unit can be switched to the low-power mode, i.e. the sleep mode, while the transceiver unit can operate as the master of the system. The overall system will then consume only about 60 mW during the listening mode. Correspondingly, if only the movement sensor has to be active, the overall system will consume only 1 mW, if the master right has been handed over from the microcontroller unit to the movement sensor and if the microcontroller unit and the transceiver unit have been switched to their sleep modes. In this situation, in which only the movement sensor is active, the movement sensor is able to detect movements, and, if the movement sensor has detected a movement, i.e. if an event has happened, the movement sensor can send, depending on the respective rules, an interrupt to wake up the microcontroller unit and handshake with the microcontroller unit to hand over the master right back. The microcontroller unit can be woken up through, for example, a data interface bus or a separate interrupt line.

Figure 4:
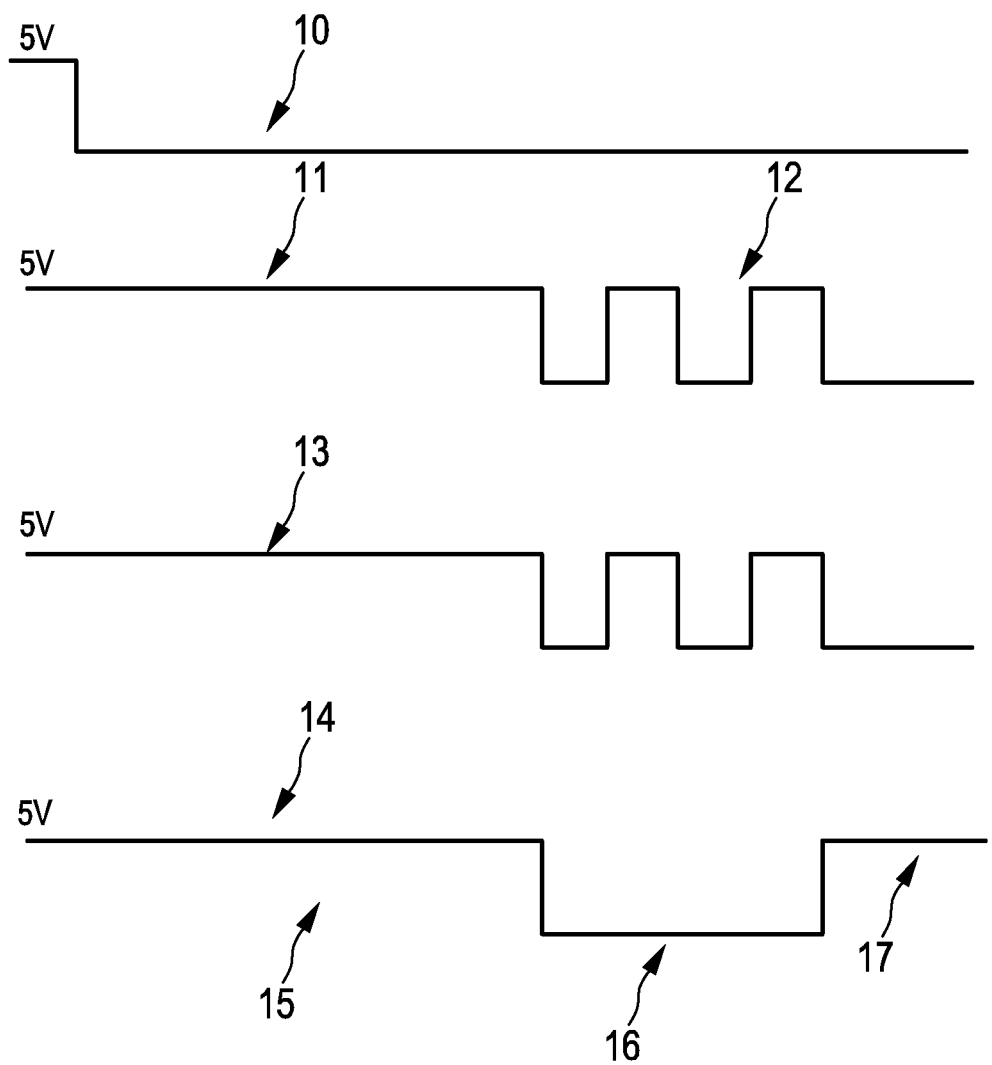
FIG. 4 shows exemplarily a timing diagram describing a possible operation of the system.

FIG. 4 shows schematically and exemplarily a timing diagram exemplarily illustrating an operation of the system comprising the main electrical unit and the peripheral electrical units.

In FIG. 4, the line 10 denotes exemplarily a voltage signal of a movement sensor, wherein the voltage signal 10 can have an upper value and a lower value. The movement sensor is active, if the voltage signal has the lower value, and the movement sensor is in the sleep mode, if the voltage signal has the upper value. Thus, in the situation shown in FIG. 4, the movement sensor was first in a sleep mode and then active.

The line 11 denotes a voltage signal being an event-trigger output from the movement sensor. The modulation of the event-trigger output 11 in the region 12 indicates the presence of, for example, a person detected by the movement sensor. The line 13 shows a corresponding interrupt, i.e. a corresponding interrupt voltage signal, sent from the movement sensor to the main electrical unit, and the line 14 denotes the voltage signal of the main electrical unit. Also the main electrical unit is in the sleep mode, if the voltage signal has a higher value, and in the active mode, if the voltage signal has a lower value. Thus, in the first region 15 the main electrical unit is in the sleep mode and the movement sensor has the control over the system. In the second region 16 the main electrical unit is active and the control has been handed over back to the main electrical unit, and in the third region 17 the main electrical unit is again in the sleep mode and the control has been handed over to the movement sensor again.

Although in the above described embodiments the control, i.e. the master right, has mainly be handed over to a single peripheral electrical unit, the control can also be handed over to several peripheral electrical units, in particular, together with control rules, which define the actions which each respective peripheral electrical unit is allowed to perform.

Although in the above described embodiments the system has been described as being, for example, a lighting system, the system can also be another system having a main electrical unit like a microcontroller unit and one or several peripheral electrical units like different peripheral modules and interfaces.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Functions like the provision of rules performed by one or several units or devices can be performed by any other number of units or devices. The functions and/or the control of the system in accordance with the above described method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A system comprising a main electrical circuit and a given peripheral electrical circuit, wherein the main electrical circuit is adapted to initially control the system, wherein the peripheral electrical circuit is adapted for being initially controlled by the main electrical circuit,
    wherein the main electrical circuit and the peripheral electrical circuit are switchable between a low-power consumption mode and a high-power consumption mode,
    wherein the main electrical circuit is adapted to hand over a control of the system to the peripheral electrical circuit on condition that the peripheral electrical circuit is in the high-power consumption mode, and to switch from the high-power consumption mode to the low-power consumption mode, after the control has been handed over,
    wherein the peripheral electrical circuit is adapted to receive the control from the main electrical circuit and to control the system if the peripheral electrical circuit is in the high-power consumption mode,
    wherein the system comprises a plurality of peripheral electrical circuits including the given peripheral electrical circuit and wherein the main electrical circuit implements any hand over of the control of the system only on condition that a total number of peripheral electrical circuits that are in the high-power consumption mode is less than or equal to a predefined number.

2. The system as defined in claim 1, wherein the main electrical circuit comprises forward handover rules defining under which conditions the control is to be handed over to the given peripheral electrical circuit and wherein the main electrical circuit is adapted to hand over the control to the given peripheral electrical circuit, if the conditions defined by the forward handover rules are fulfilled.

3. The system as defined in claim 1, wherein the predefined number is one.

4. The system as defined in claim 1, wherein the given peripheral electrical circuit is adapted to send an acknowledgement to the main electrical circuit, if the given peripheral electrical circuit has received the control, wherein the main electrical circuit is adapted to switch from the high-power consumption mode to the low-power consumption mode, after the main electrical circuit has received the acknowledgement.

5. The system as defined in claim 1, wherein the given peripheral electrical circuit comprises back handover rules defining under which conditions the control is to be handed over back to the main electrical circuit and wherein the given peripheral electrical circuit is adapted to hand over the control back to the main electrical circuit, if the conditions defined by the back handover rules are fulfilled.

6. The system as defined in claim 5, wherein the main electrical circuit is adapted to send an acknowledgement to the given peripheral electrical circuit, if the main electrical circuit has received the control, wherein the given peripheral electrical circuit is adapted to continue controlling the system until the given peripheral electrical circuit has received the acknowledgement.

7. The system as defined in claim 1, wherein the main electrical circuit is a microcontroller and one or several of the plurality of peripheral electrical circuits are part of at least one of a sensor, a transceiver, an interface, and a light source.

8. The system as defined in claim 1, wherein the main electrical circuit is adapted to hand over control rules with handing over the control to the given peripheral electrical circuit, wherein the control rules define the control performed by the given peripheral electrical circuit.

9. The system as defined in claim 8, wherein the control rules define requests that can be sent by the given peripheral electrical circuit having the control to at least one other peripheral electrical circuit of the plurality of peripheral electrical circuits.

10. The system as defined in claim 1, wherein the plurality of peripheral electrical circuits are switchable between a low-power consumption mode and a high-power consumption mode,
    wherein the main electrical circuit is adapted to hand over a control of the system to the one or several of the plurality of peripheral electrical circuits on condition that the respective one or several peripheral electrical circuits are in the high-power consumption mode, and to switch the main electrical circuits from the high-power consumption mode to the low-power consumption mode, after the control has been handed over,
    wherein the one or several of the plurality peripheral electrical circuits are adapted to receive the control from the respective main electrical circuit and to control the system if the respective peripheral electrical circuit is in the high-power consumption mode.

11. A method for controlling a system comprising a main electrical circuit and a given peripheral electrical circuit, wherein the main electrical circuit is adapted to initially control the system, wherein the peripheral electrical circuit is adapted for being initially controlled by the main electrical circuit, wherein the main electrical circuit and the peripheral electrical circuit are switchable between a low-power consumption mode and a high-power consumption mode, the method comprising:
    handing over a control of the system from the main electrical circuit to the peripheral electrical circuit on condition that the peripheral electrical circuit is in the high-power consumption mode;
    controlling the system by the peripheral electrical circuit if the peripheral electrical circuit is in the high-power consumption mode and has received the control from the main electrical circuit; and
    switching the main electrical circuit from the high-power consumption mode to the low-power consumption mode, after the control has been handed over, wherein the system comprises a plurality of peripheral electrical circuits including the given peripheral electrical circuit and wherein any hand over of the control of the system is implemented only on condition that a total number of peripheral electrical circuits that are in the high-power consumption mode is less than or equal to a predefined number.

12. A computer program stored on a non-transitory storage medium for controlling a system comprising a main electrical circuit and a peripheral electrical circuit, wherein the main electrical circuit and the peripheral electrical circuit are switchable between a low-power consumption mode and a high-power consumption mode, the computer program comprising program code for causing the system to carry out the steps of the method as defined in claim 11, when the computer program is run on a computer controlling the system.

13. The method of claim 11, wherein the predefined number is one.

* * * * *